United States Patent [19]
Verpoort

[11] Patent Number: 4,817,858
[45] Date of Patent: Apr. 4, 1989

[54] METHOD OF MANUFACTURING A WORKPIECE OF ANY GIVEN CROSS-SECTIONAL DIMENSIONS FROM AN OXIDE-DISPERSION-HARDENED NICKEL-BASED SUPERALLOY WITH DIRECTIONAL COARSE COLUMNAR CRYSTALS

[75] Inventor: Clemens Verpoort, Fislisbach, Switzerland

[73] Assignee: BBC Brown Boveri AG, Baden, Switzerland

[21] Appl. No.: 192,630

[22] Filed: May 11, 1988

[30] Foreign Application Priority Data

May 13, 1987 [CH] Switzerland .................. 1839/87

[51] Int. Cl.$^4$ .................. B23K 20/02; B21K 3/04
[52] U.S. Cl. .................. 228/193; 228/203; 228/236; 228/239; 228/263.13; 29/156.8 B; 29/156.8 H; 148/11.5 N; 148/13.1; 416/223 R; 416/232; 416/233; 419/28; 419/29; 419/54; 419/55
[58] Field of Search .............. 228/193, 203, 236, 239, 228/231, 232, 263.13; 29/156.8 B, 156.8 H; 148/11.5 N, 13.1; 416/223 R, 232, 233; 419/28, 29, 54, 55

[56] References Cited

U.S. PATENT DOCUMENTS 3,758,741  9/1973  Holko et al. .................. 228/193
4,706,361  11/1987  Meyer et al. .................. 228/193

FOREIGN PATENT DOCUMENTS

0090887  10/1983  European Pat. Off. .
0171230  2/1986  European Pat. Off. .
0192105  8/1986  European Pat. Off. .
0205859  12/1986  European Pat. Off. .

Primary Examiner—Nicholas P. Godici
Assistant Examiner—Samuel M. Heinrich
Attorney, Agent, or Firm—Burns, Doane, Swecker & Mathis

[57] ABSTRACT

Method of manufacturing a workpiece of any given cross-sectional dimensions from an oxide-dispersion-hardened nickel-based superalloy available in the form of coarse-grained longitudinally directed columnar crystals by connecting previously very finely machined workpiece parts derived from a semi-finished product by diffusion-bonding using hot isostatic pressing, the workpiece parts being first heat-treated under a protective gas in the temperature range of 50° to 100° C. below the recrystallization temperature, under a pressure $p_k$ of not more than 5 MPa with the machined surfaces to be connected joined together, the workpiece then being heated at least to a critical temperature $T_K$, above which no further cold working takes place, and the pressure then being gradually increased to the diffusion bonding pressure $p_{max}$ of 100 to 300 MPa with simultaneous increase in temperature are a heating rate of not more of 2° C./min to the diffusion bonding temperature $T_D$ of 0 to 50° C. below the recrystallization temperature, this condition being maintained for 1 to 24 hours. Safe variant: only raise the pressure when $T_D$ has been reached!Application: gas turbine blading of large dimensions.

8 Claims, 5 Drawing Sheets

METHOD OF MANUFACTURING A WORKPIECE OF ANY GIVEN CROSS-SECTIONAL DIMENSIONS FROM AN OXIDE-DISPERSION-HARDENED NICKEL-BASED SUPERALLOY WITH DIRECTIONAL COARSE COLUMNAR CRYSTALS

BACKGROUND OF THE INVENTION

1. Field of the Invention

Oxide-dispersion-hardened nickel-based super-alloys which, thanks to their outstanding mechanical properties at high temperatures, are used in the construction of thermal machine components subjected to high thermal and mechanical loads. Preferred field: blading materials for gas turbines.

The invention relates to the further development and extension of the field of application of relatively brittle oxide-dispersion-hardened superalloys, which have high hot strength but are difficult to shape and which, as a monolithic preliminary material with directional coarse grained columnar structure of the crystallites, can primarily only be manufactured in limited cross-sectional dimensions.

In particular, it relates to a method of manufacturing a workpiece of any cross-sectional dimensions from an oxide-dispersion-hardened nickel-based superalloy with directional coarse columnar crystals set with their longitudinal axis at right angles to the cross-sectional area.

2. Discussion of Background

Oxide-dispersion-hardened superalloys based on nickel have attractive high temperature mechanical properties and permit the working medium temperatures of thermal machines to be increased by a further 100° to 150° C. relative to non-dispersion-hardened nickel-based superalloys. This is highly desirable from the point of view of increasing the efficiency of energy conversion. In order to exploit these alloys fully, however, the workpieces manufactured from them must exist in the coarse crystalline condition. In the case of a shaft-type component with a pronounced longitudinal axis, this means that the material must be available in the form of longitudinally directed columnar crystals. It is only by this means that the high creep strengths can be achieved at extremely high duty temperatures.

Oxide-dispersion-hardened superalloys are manufactured powder-metallurgically by mechanical alloying. The previously compressed material is, generally speaking, processed by extrusion to produce a dense, pore-free semi-finished product. Because of its high hot strength, the extrusion cross-section obtainable are limited to certain dimensions because of the limited forces of the extrusion presses. In order to achieve longitudinally directed columnar crystals, the semi-finished product must be subjected to a zone heat treatment process (directional recrystallization). This demands certain heating and cooling conditions over the whole of the cross-section. The cross-section of the semi-finished product to be treated is therefore again limited for thermodynamic reasons (temperature gradient). The largest rectangular cross-sections attainable on the basis of the thermal conductivity of the material are about 35 mm × 110 mm. A prismatic semi-finished product of 32 mm × 105 mm is currently obtainable commercially. In consequence, oxide-dispersion-hardened superalloys can, at the moment, only be employed for limited blading sizes.

In the manufacture of industrial gas turbines of high power, the blading dimensions required already exceed the cross-sections of the commercially obtainable and technically feasible semi-finished products in oxide-dispersion-hardened alloys. In consequence, the use of these alloys is currently excluded precisely where their employment would be most promising.

It has already been proposed that parts in an oxide-dispersion-hardened superalloy in fine-grained condition should be combined by diffusion bonding to form larger bodies and that these should subsequently be converted to the coarse-grained condition by recrystallization heat treatment (see US-A-3 758 741). This method fails, however, in the case of the zone heat treatment of large cross-sections. Because of a lack of sufficiently high temperature gradients, the parts located within the workpiece cannot be forced to recrystallize into coarse-grained columnar crystals. As a result, the creep strength drops to a fraction of the optimum value. The workpiece is useless for the intended purpose.

Hot shaping of sheets of coarse-grained oxide-dispersion-hardened materials which are difficult to deform by hot isostatic pressing and, alternatively, simultaneous diffusion bonding of several sheets or sheet ends is known (see, for example, EP-A-0 192 105). This patent concerns limited cross-sections and dimensions in which the problems mentioned above do not, as a rule, appear. Furthermore, the relevant bonding zones are not generally subjected to high loads in operation and, in consequence, the appearance of any fine-grained zones which may occur has no serious effect on the functional capability of the workpiece.

There is a large requirement to extend the field of application of oxide-dispersion-hardened materials in the construction of thermal machines. The designer should not be restricted by any sort of limitations with respect to the dimensions of the workpieces; this will become increasingly important in future because of the steadily increasing size of the machine units (industrial gas turbines, for example).

SUMMARY OF THE INVENTION

Accordingly, the object of the invention is to provide a method of manufacturing a workpiece of any given cross-sectional dimensions from an oxide-dispersion-hardened nickel-based superalloy with directional coarse columnar crystals with their longitudinal axis at right angles to the cross-sectional area, which method ensures even grain size and good reproducibility over the whole cross-section while maintaining the greatest possible simplicity. For this purpose, even very small zones of fine-grained crystallites arranged in rows or like a chain of pearls must be avoided with absolute reliability.

This object is achieved in that, in the method mentioned at the beginning, at least two workpiece parts consisting of the material quoted and available in the zone heat-treated coarse crystalline condition are mechanically fine machined by milling and grinding to produce bonding surfaces on at least one side of each containing the longitudinal axis of the columnar crystals and are subsequently heat-treated in the temperature range from 50° to 100° C. below the recrystallization temperature for 0.5 to 6 hours to remove the stresses and structural perturbations introduced by cold working during the machining, further that the workpiece parts are joined together at the mutually corresponding bonding surfaces and are subjected to a diffusion bonding process by means of hot isostatic pressing in such a way that the workpiece parts are initially brought to 600° C. under a pressure $p_K$ of not more than 5 MPa and are then heat-treated at a heating rate of not more than 2° C./min to at least a critical temperature $T_K$, above which no further cold working occurs and, subsequently, the pressure being slowly increased at a rate of not more than 1 MPa/min to a $p_{max}$ of 100 to 300 MPa with simultaneous heating at 2° C./min up to a diffusion bonding temperature $T_D$ of 0° to 50° C. below the recrystallization temperature and that this condition is retained for 1 to 24 hours and the workpiece bonded in this way is cooled to room temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
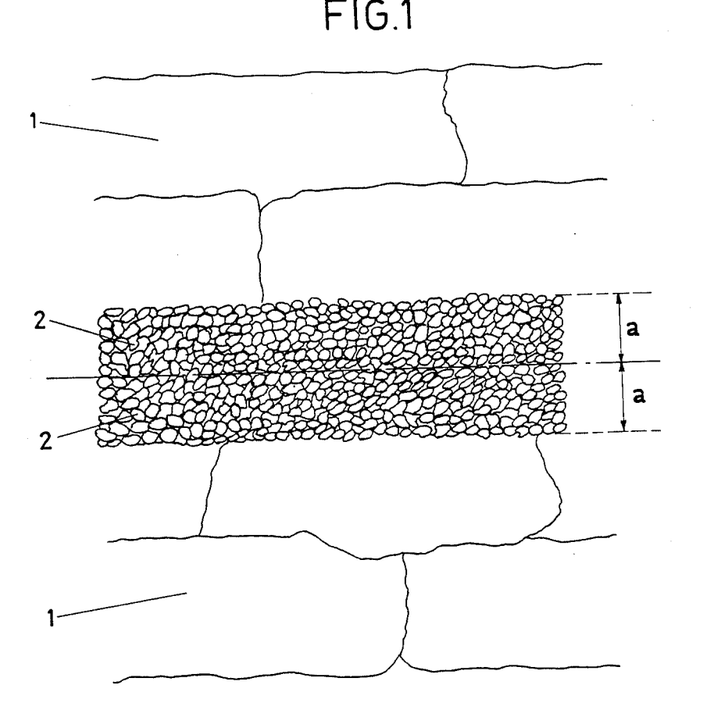
FIG. 1 shows a diagrammatic section (metallographic polished section with the grain structure) through the bonding zone of conventionally bonded, non-pretreated workpiece parts.

FIG. 1 shows a diagrammatic section in the form of a simplified metallographic polished section to show the grain structure through the bonding zone of non-pretreated conventionally bonded workpiece parts. The workpiece parts were originally available in the zone heat-treated condition and exhibit the characteristic coarse-grained longitudinally directed columnar crystals 1. In the bonding zone can be seen fine-grained crystallites 2, generally of globulite form which arose due to the recrystallization of the surface zone (a)—previously cold-worked by machining—during the subsequent heating to the bonding temperature. The remaining cold-worked zone (a) due to fine machining (grinding), which has subsequently been recrystallized, generally has a depth, on one side, of some 10 to 20 microns. This is indicated by the 10 micron scale on the drawing.

Such conventionally bonded workpieces show only a fraction of the hot strength (in particular the creep limit) of the original non-bonded material during operation at high temperatures. Such components cannot be used for applications in highly loaded thermal machines.

Figure 2:
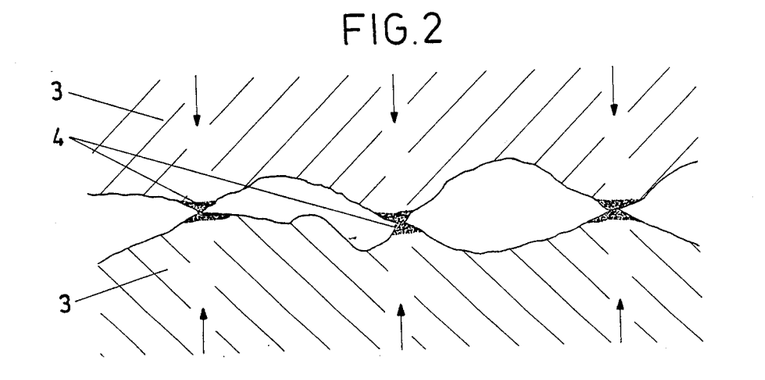
FIG. 2 shows a diagrammatic section, at high magnification, through workpiece parts pressed together.

FIG. 2 shows a diagrammatic section, at high magnification, through two workpiece parts which have been pressed together. Because of the imperfections of even the best surfacing methods (grinding, polishing, etching, etc.), a surface departing substantially from a mathematical plane and exhibiting the characteristic surface roughness remains. The workpiece parts which have to be bonded by pressing together are indicated by 3. The pressure forces used for this purpose are indicated by vertical arrows in opposing directions. Contact occurs only at a few points arbitrarily distributed over the surfaces. These contact points 4 are cold-worked when the parts are pressed together. No measures which can be taken will avoid this local cold working.

Figure 3:
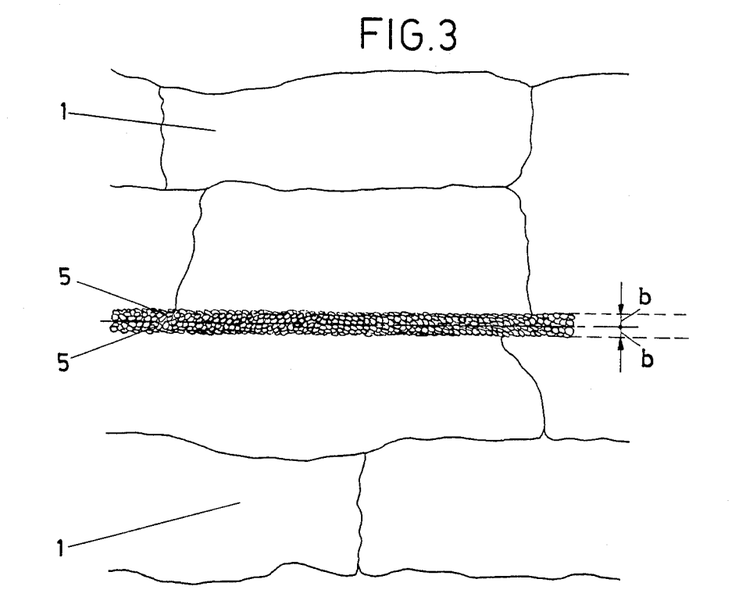
FIG. 3 shows a diagrammatic section (metallographic polished section with the grain structure) through the bonding zone of conventionally bonded workpiece parts whose cold-worked surface layers have been previously removed.

FIG. 3 shows a diagrammatic section (metallographic polished section characterizing the grain structure) through the bonding zone of conventionally bonded workpiece parts whose cold-worked surface layers have been previously removed (in contrast to FIG. 1). The columnar crystals of the material in the supply condition are indicated by 1. The fine-grained crystallites cold-worked by the pressing together of the recrystallized surface zone (b) of a workpiece part are indicated by 5. The surface zones previously cold-worked by machining were completely removed by appropriate means (etching, electro-erosion, etc.). Referring to FIG. 2, there is nevertheless a fine-grained—but narrower—surface zone (b) which is only formed in the course of the bonding process. Generally speaking, this surface zone (b) has a depth on one side of some 0.5 to 2 microns which is indicated by the scale 1 micron on the drawing. This zone, however, is sufficient to make the high temperature strenght of a component drop to the point where it is unusable in operation.

Figure 4:
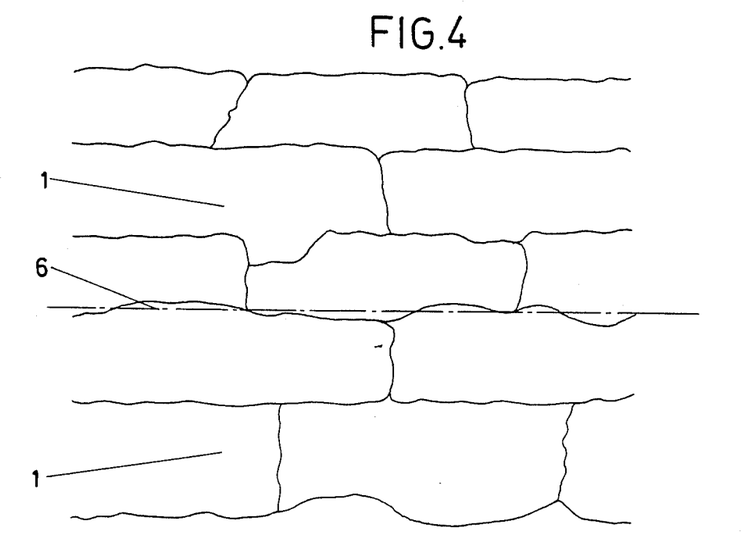
FIG. 4 shows a diagrammatic section (metallographic polished section with the grain structure) through the bonding zone of workpiece parts bonded according to the invention.

FIG. 4 shows a diagrammatic section in the form of a simplified metallographic polished section to show the grain structure through the bonding zone of workpiece parts pretreated and appropriately bonded according to the invention. The coarse-grained, longitudinally directed columnar crystals 1 of each workpiece part present in the supply condition have been retained unaltered even after bonding and merge "seamlessly" one into the other. There is no fine-grained intermediate zone. 6 represents only the hypothetical, theoretical geometrical bonding surface with the avoidance of the fine-grain recrystallization. A workpiece with such a structure behaves completely monolithically, as if it had always had the desired final dimensions from the beginning.

Figure 5:
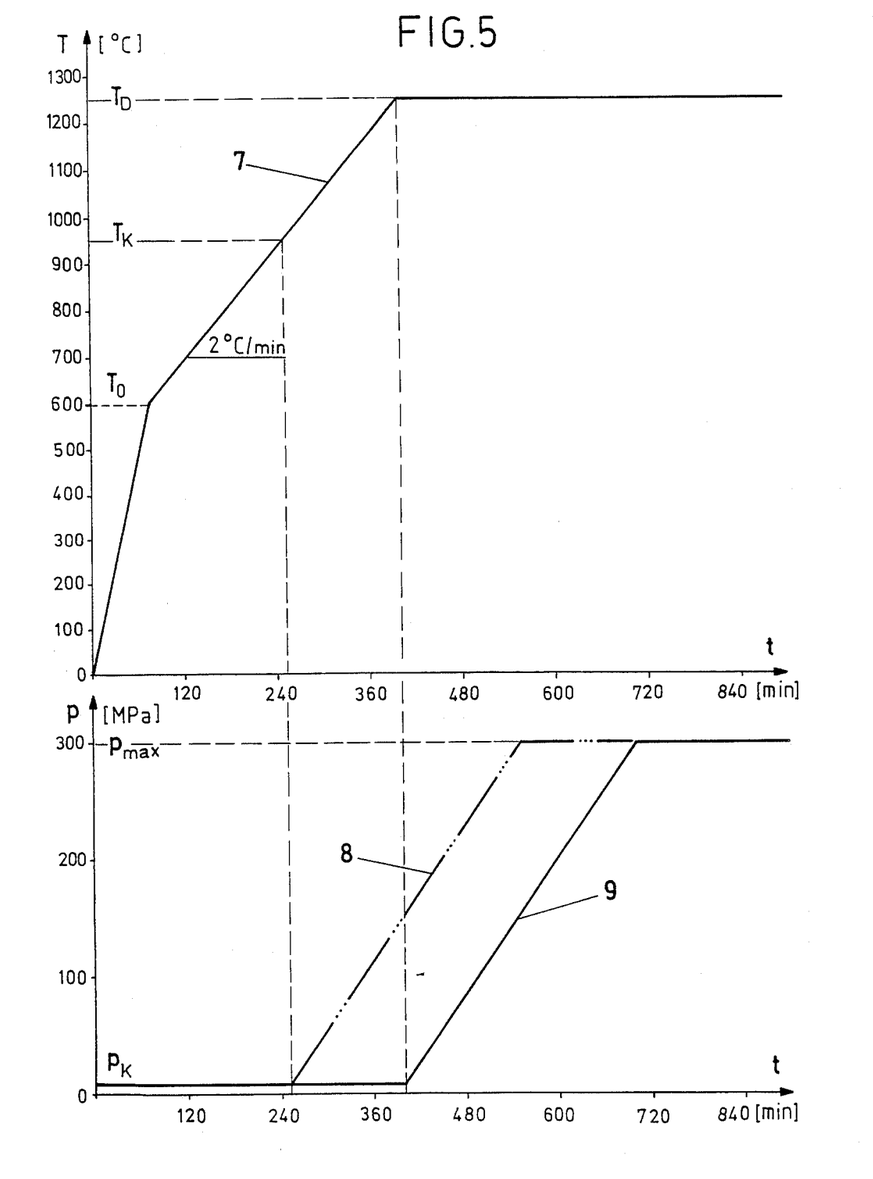
FIG. 5 shows a diagram with the variation of the temperature T and pressure p as a function of time t for the bonding of workpiece parts by hot isostatic pressing according to the invention.

FIG. 5 shows a diagram with the variation of the temperature T and the pressure p as a function of the time t for the bonding of workpiece parts by hot isostatic pressing according to the in invention. The abscissa in each case is the time axis t in minutes. At the top, the ordinate shows the temperature axis T in degrees centigrade for the workpiece parts to be bonded whereas, at the bottom, the ordinate shows the pressure axis p in MPa for the isostatic pressure occurring in the container. The Curve 7 refers to the temperature variation. The workpiece parts may, at first, be heated relatively rapidly to a temperature $T_o$ of about 600° C. The further heating occurs slowly—at not more than 2° C./min—so that the stresses can be relieved and the crystals can recover in the contact zone of the workpiece parts without recrystallization occurring. The critical temperature $T_K$, which is the minimum temperature to which the workpiece parts must be heated in order to avoid any danger of cold-working in the surface zones when the workpiece parts are subsequently pressed together, is about 950° C.; it is indicated by a dotted line. Heating continues at not more than 2° C./min up to the diffusion bonding temperature shown, $T_D$; the parts to be bonded are held at this temperature for a sufficient period of time (1 to 24 hours depending on size, shape and alloy) for the coarse crystals in mutual contact to have grown completely together without recrystallization (without visible seam). The diffusion bonding temperature $T_D$ in this bonding method is in the range of 0° to 50° C. below the recrystallization temperature of the material concerned—about 1200° C. in the present case. The pressure $p_K$ with which the workpiece parts are first bonded together in the cold condition (in the present case, not more than 5 MPa) can only be increased slowly to the drawn-in value $p_{max}$ (diffusion bonding pressure) after the temperature $T_K$ has been reached—Curve 8! In cases of doubt—if the critical temperature $T_K$ is unknown—the workpiece parts can also be first heated to the diffusion bonding temperature $T_D$ before the increase in pressure is commenced—Curve 9! All the practical ways of carrying out the method lie, therefore, within the limits between the Curves 8 and 9.

Figure 6:
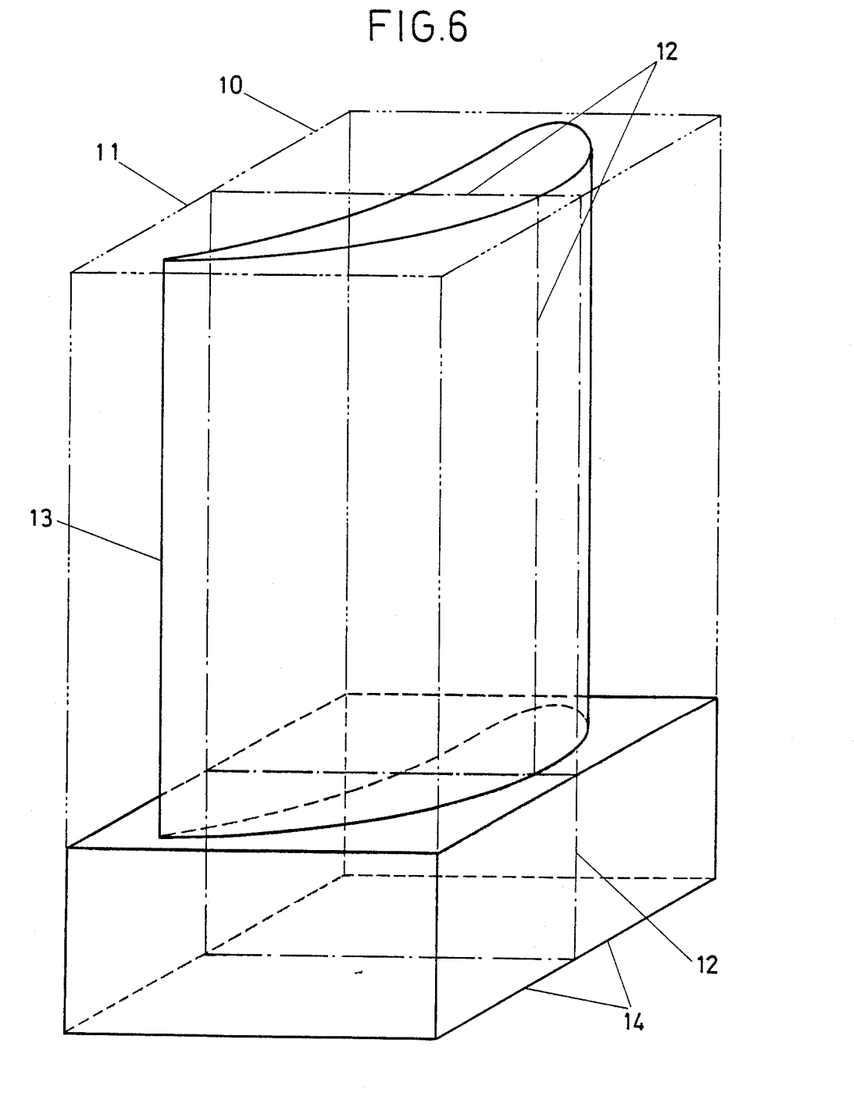
FIG. 6 shows a diagrammatic perspective representation of turbine blading manufactured from two bonded workpiece parts.

Turbine blading manufactured from two bonded workpiece parts is shown diagrammatically in perspective in FIG. 6. 10 is a prismatic workpiece part I and 11 is a similar workpiece part II. It is advantageous for both parts to be of the same bar material and therefore to have—as in the case shown—the same dimensions. 12 is the bonding surface between the workpiece part I and the workpiece part II, in the present case a plane parallel to a side surface. 13 is the airfoil and 14 is the root of the blading. The bonding surface 12 is loacted in such a way that it coincides approximately with the plane located transversely through the thickest section of the wing profile of the blading in the direction of the maximum bending stress occurring in operation.

Figure 7:
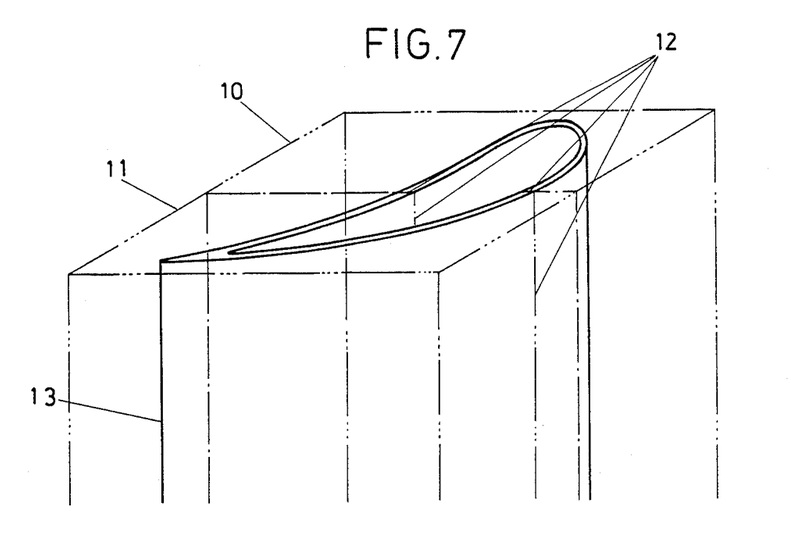
FIG. 7 shows a diagrammatic perspective representation of the tip part of the airfoil of turbine blading manufactured from two bonded workpiece parts and having a cooling duct.

FIG. 7 shows a diagrammatic perspective representation of the tip part of the airfoil of turbine blading having a cooling duct in the longitudinal direction (blading longitudinal axis) and manufactured from two bonded workpiece parts. The figure requires no further explanation. The principle of the position of the bonding surface 12 is the same as that described with respect to FIG. 6 and the reference signs are also the same.

Figure 8:
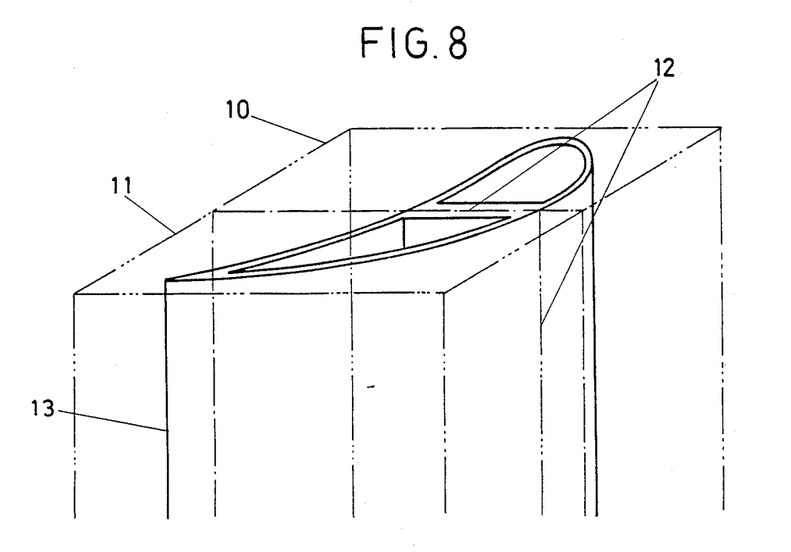
FIG. 8 shows a diagrammatic perspective representation of the tip part of the airfoil of turbine blading manufactured from two bonded workpiece parts and having two cooling ducts.

FIG. 8 shows a diagrammatic perspective representation of the tip part of the airfoil of turbine blading having two cooling ducts and manufactured from two bonded workpiece parts. In this case, the bonding surface 12 is located in the center of the web separating the two cooling ducts. Otherwise, what is stated with respect to FIG. 7 applies.

ILLUSTRATIVE EXAMPLE 1

The initial material available was an oxide-dispersion-hardened nickel-based superalloy in the form of a prismatic semi-finished product with a rectangular cross-section of 70 mm width and 32 mm thickness. The material had the INCO commerical name of MA 6000 and the following composition:

Cr=15.0% by weight
Al=4.5% by weight
Ti=2.5% by weight
Mo=2.0% by weight
W=4.0% by weight
Ta=2.0% by weight
Zr=0.15% by weight
B=0.01% by weight
C=0.05% by weight
$Y_2O_3$=1.1% by weight
Ni=Rest In the supply condition, the material consisted of deliberately adjusted coarse-grained, longitudinally directed columnar crystals of, on the average, 20 mm length, 5 mm width and 3 mm thickness, produced by zone heat-treatment and recrystallization. Prisms, each about 170 mm long, were cut off from this semi-finished product, and one wide side (70 mm) on each was made as plane as possible by machining (fine grinding). The residual surface roughness was about 3 microns.

The recrystallization temperature of the material MA 6000 is approximately 1200° C. For the purpose of removing the stresses and grain perturbations introduced by the cold working due to the surface machining, the two machined prismatic workpiece parts were heat-treated for 3 hours under a protective gas at a temperature of 1190° C. and were than slowly cooled. The machined surfaces of the workpiece parts to be bonded were now joined together and inserted in a thin-walled prismatic capsule of soft steel and appropriate dimensions. The internal dimensions of the capsule were such that the workpiece parts just fitted into it tightly. The capsule was now closed at the end, evacuated and then welded so as to be vacuum-tight and gas-tight. The workpiece parts encapsulated in this manner where now introduced into a device for hot isostatic pressing, were initially subjected to a slight all-round pressure $p_o$ of 3 MPa and were heated within about 1 hour to a temperature of about 600° C. Slower heating at a heating rate of about 2° C./min then took place to a temperature $T_D$ of 1180° C., which was retained for a duration of 10 hours. On reaching a temperature $T_K$ of 950° C., the pressure was gradually and evenly raised over a period of about 4 hours to a $p_{max}$ value of 250 MPa. This pressure was then held constant until the end of the hot isostatic pressing (diffusion bonding process). The bonded workpiece was then slowly cooled and subjected to testing. The dimensions were now:

Width=70 mm
Thickness=63.5 mm
Length=170 mm

Longitudinal and transverse testpieces were manufactured and the mechanical strength values at room temperature and at 1000° C. were measured and compared with those of the initial material. The creep strength at the higher temperature was given particular attention. No decrease in strength of any variety could be found on the finished workpiece.

ILLUSTRATIVE EXAMPLE 2

A workpiece with the same dimensions as Example 1 was bonded from the material MA 6000 (INCO) exactly as described in that example. Gas turbine blading similar to FIG. 6 was machined out of this workpiece. Here, the bonding surface 12 was located in the relatively thick part of the airfoil 13 and extended approximately at right angles to the wing profile. In contrast to FIG. 6, the blading had a narrow firtree root and had a shroud plate at the tip. The total length of the blading including the root was 160 mm. The airfoil 13 with wing profile had the following dimensions:
  Total length = 120 mm
  Maximum width = 50 mm
  Maximum thickness = 13 mm
  Profile height = 15 mm The blading was subjected to severe test conditions. Among others, thermal shock tests were carried out between 200° C. and 950° C. No cracks could be found even after 400 temperature cycles.

ILLUSTRATIVE EXAMPLE 3

A workpiece made up of two prismatic bodies of square cross-section and 58 mm side length was bonded from the material MA 6000 (for composition, see Example 1). The bonded workpiece had a total length of 190 mm. Otherwise, the manufacturing process took place as described in Example 1. A gas turbine rotor blade with firtree root and shroud plate was manufactured from the bonded workpiece with the dimensions:
  Width = 115.5 mm
  Thickness = 58 mm
  Length = 190 mm.

The bonding surface 12 (see FIG. 6) extended transverse to the wing profile of the airfoil 13. The latter had the following dimensions:
  Total length = 140 mm
  Maximum width = 75 mm
  Maximum thickness = 22 mm
  Profile height = 25 mm.

The blade was built into a gas turbine and subjected to some hundreds of cycles of alternating load (including load rejections). No damage of any sort (hair cracks) could be found after 5000 operating hours. The blade was removed and its hot strength was determined. It was always within the tolerance band of the semi-finished product (bar material) in the supply condition.

ILLUSTRATIVE EXAMPLE 4

An oxide-dispersion-hardened nickel-based superalloy in the form of a prismatic semi-finished product with a rectangular cross-section of 95 mm width and 30 mm thickness was available as the initial material. The material had the following composition:
  Cr = 20.0% by weight
  Al = 6.0% by weight
  Mo = 2.0% by weight
  W = 3.5% by weight
  Zr = 0.19% by weight
  B = 0.01% by weight
  C = 0.01% by weight
  $Y_2O_3$ = 1.1% by weight
  Ni = Rest The material was available in the zone heat-treated recrystallized coarse-grained condition. The longitudinal directed columnar crystals had, on the average, a length of 18 mm, a width of 6 mm and a thickness of 2.5 mm. Three prisms, each about 220 mm long, were cut off from this semi-finished product and the two wide sides (95 mm) were machined plane by fine-grinding on one of the prisms and one wide side (95 mm) was machined plane by fine-grinding on each of the other two prisms. The surface roughness was still about 4 microns.

The recrystallization temperature of this material is about 1200° C. The three prismatic workpiece parts were now subjected to heat treatment under protective gas at a temperature of 1120° C. for 4 hours and were then slowly cooled. By this means, the operative force introduced into the surface zones by the cold working during grinding was removed. The three workpieces were now placed with their machined surfaces (wide side on wide side) one above the other and the pack formed in this way was inserted into a prismatic capsule whose internal dimensions were just larger than the dimensions of the pack. The capsule had a wall-thickness of 2.5 mm and consisted of a soft low-carbon steel. The capsule was then cooled at the end, evacuated and welded so as to be gas and vacuum tight. The complete assembly was now subjected to a diffusion bonding process by hot isostatic pressing. The three workpieces, in their encapsulated condition, were first subjected to an all-round pressure $p_K$ of 5 MPa, were then heated within 1½ hours to a temperature of about 600° C. and were subsequently heated at a heating rate of 1.5° C./min to a temperature $T_D$ of 1160° C. The latter temperature was maintained for a total of 12 hours. After the temperature $T_D$ had been reached, the pressure was brought to the final hot isostatic pressing value $p_{max}$ of 300 MPa at a rate of increase of 1 MPa/min and was kept constant. After the workpiece diffusion-bonded in this manner had been slowly cooled to room temperature, its dimensions were as follows:
  Width = 95 mm
  Thickness = 89 mm
  Length = 220 mm A gas turbine nozzle guide vane similar to FIG. 6 was machined from this workpiece. The airfoil 13 was provided, in a manner similar to that shown in FIG. 7, with a cooling duct located along the longitudinal axis. During the machining, the workpiece was oriented in such a way that the bonding surfaces 12 came to be located transverse to the wing profile. The airfoil had the following dimensions:
  Total length = 130 mm
  Maximum width = 80 mm
  Maximum thickness = 22 mm
  Profile height = 26 mm
  Average wall thickness = 3.5 mm The complete vane, including the root and the shroud plate, had a total length of 210 mm. The shroud plate had the following dimensions:
  Length (in the axial direction of the turbine) = 66 mm
  Width (in the tangential direction of the turbine) = 60 mm
  Height (in the radial direction of the turbine) = 8 mm.

The vane root had the following dimensions:
  Length (axial) = 80 mm
  Width (tangential) = 72 mm
  Height (radial) = 80 mm The vane was subjected to thermal shock tests as described in Example 2 and these produced no cracks of any sort.

ILLUSTRATIVE EXAMPLE 5

An oxide-dispersion-hardened nickel-based superalloy in the form of a prismatic semi-finished product with a rectangular cross-section of 95 mm width and 30 mm thickness was available as the initial material. The workpiece had the following composition:
  Cr = 17.0% by weight
  Al = 6.0% by weight
  Mo = 2.0% by weight
  W = 3.5% by weight
  Ta = 2.0% by weight
  Zr = 0.15% by weight B=0.01% by weight
C=0.05% by weight
Y$_2$O$_3$=1.1% by weight
Ni=Rest The semi-finished product was available in the zone heat-treated recrystallized coarse-grained condition. The longitudinally directed columnar crystals had, on the average, a length of 16 mm, a width of 5 mm and a thickness of 3 mm. Three prisms, each about 240 mm long, were cut off from this semi-finished product and the two wide sides (95 mm) were machined exactly plane by fine-grinding on one of the prisms and one wide side (95 mm) was machined exactly plane by fine-grinding on each of the other two prisms. The remaining surface roughness was about 3.5 microns.

The recrystallization temperature of this material is about 1200° C. In what follows, the procedure is similar to that given in Example 4. The heat treatment was carried out for 3 hours at 1150° C. The three workpiece parts, in the encapsulated condition, were subjected to an all-round pressure $p_K$ of 4 MPa. After the workpiece had been heated from 600° C. to about 1100° C. at a heating rate of 2° C./min, the increase in the pressure at a rate of increase of about 0.8 MPa/min was commenced. The diffusion-bonding temperature $T_D$ was about 1190° C. and was maintained for 24 hours. The pressure $p_{max}$ employed in the process was 280 MPa and was kept constant throughout the pressing. The dimensions of this bonded workpiece were as follows:
  Width=95 mm
  Thickness=95 mm
  Length=240 mm A gas turbine nozzle guide vane similar to FIG. 6 was machined from this workpiece. Similar to FIG. 8, the airfoil 13 was provided with two cooling ducts located along the longitudinal axis. The workpiece was oriented in such a way that the bonding surfaces 12 came to be located approximately transverse to the wing profile. In addition, one of the bonding surfaces 12 was located in the centre of the web separating the two cooling ducts. The airfoil had the following dimensions:
  Total length=150 mm
  Maximum width=82 mm
  Maximum thickness=23 mm
  Profile height=28 mm
  Average wall thickness=4 mm The complete vane, including the root and the shroud plate, had a total length of 230 mm. The shroud plate had the following dimensions:
  Length (in the axial direction of the turbine)=68 mm
  Width (in the tangential direction of the turbine)=62 mm
  Height (in the radial direction of the turbine)=10 mm.

The vane root had the following dimensions:
  Length (axial)=82 mm
  Width (tangential)=75 mm
  Height (radial)=85 mm The nozzle guide vane was built into a gas turbine and subjected to severe fluctuating load conditions. No surface damage could be found after 3000 operating hours. When the guide vane had been removed, it was taken apart and subjected to material testing. The measured values of strength, extension, toughness, etc. correspond to those of the initial material used for the diffusion bonding in the supply condition.

The invention is not limited to the illustrative examples. Using the method described, it is fundamentally possible to connect by diffusion bonding all oxide-dispersion-hardened high temperature alloys taking the form of coarse-grained, longitudinally directed columnar crystals and available as initial material only with limited dimensions, to produce workpieces of any given size. This particularly refers to superalloys based on nickel, cobalt and iron. The main field of application is in the manufacture of large components for highly-loaded thermal machines (turbine blading).

It is necessary to ensure that any consequences of surface treatment (by operative forces introduced by cold working) are removed by a suitable means (heat treatment, etching, electro-polishing, etc.) before diffusion bonding. This can take place by means of heat treatment lasting between 0.5 and 6 hours in the temperature range of 50° to 100° C. below the recrystallization temperature of the material. The increase in pressure to be carried out after reaching the temperature $T_K$ (above which no cold working occurs) should take place slowly, i.e. with a rate of increase of not more than 1 MPa/min. The maximum diffusion bonding pressure to be used, $p_{max}$, is—depending on the material, workpiece size and duration—100 to 300 MPa and is maintained for 1 to 24 hours. For safety reasons, it is recommended that in certain cases the increase in pressure should not commence until the diffusion bonding temperature $T_D$ is reached (see Curve 9 in FIG. 5).

What is claimed as new and desired to be secured by Letters Patent of the United States is:

1. A method of manufacturing a workpiece of any given cross-sectional dimensions from an oxide-dispersion-hardened nickel-based superalloy with directional coarse columnar crystals set with their longitudinal axis at right angles to the cross-sectional area, wherein, at least two workpiece parts consisting of the material quoted and available in the zone heat treated coarse crystalline condition are mechanically fine machined by milling and grinding to produce bonding surfaces on at least one side of each containing the longitudinal axis of the columnar crystals and are subsequently heat-treated in the temperature range from 50° to 100° C. below the recrystallization temperature for 0.5 to 6 hours to remove the stresses and structural perturbations introduced by cold working during the machining, wherein further the workpiece parts are joined together at the mutually corresponding bonding surfaces and are subjected to a diffusion bonding process by means of hot isostatic presssing in such a way that the workpiece parts are initially brought to 600° C. under a pressure $p_K$ of not more than 5 MPa and are then heat-treated at a heating rate of not more than 2° C./min to at least a critical temperature $T_K$, above which no further cold working occurs and, subsequently, the pressure being slowly increased at a rate of not more than 1 MPa/min to a $p_{max}$ of 100 to 300 MPa with simultaneous heating at 2° C./min up to a diffusion bonding temperature $T_D$ of 0° to 50° C. below the recrystallization temperature and wherein this condition retained for 1 to 24 hours and the workpiece bonded in this way is cooled to room temperature.

2. A method as claimed in claim 1, wherein the workpiece parts are heated from 600° C., initially under a pressure of not more than 5 MPa, at a heating rate of not more than 2° C./min to a temperature of 0° to 50° C. below the recrystallization temperature, the pressure being then increased slowly at a rate of increase of not more than 1 MPa/min.

3. A method as claimed in claim 1, wherein the oxide-dispersion-hardened nickel-based superalloy has the following composition:

Cr = 15.0% by weight
Al = 4.5% by weight
Ti = 2.5% by weight
Mo = 2.0% by weight
W = 4.0% by weight
Ta = 2.0% by weight
Zr = 0.15% by weight
B = 0.01% by weight
C = 0.05% by weight
$Y_2O_3$ = 1.1% by weight
Ni = Rest and wherein the heat treatment to remove the consequences of the cold working is carried out at a temperature of 1100° to 1150° C. for 2 hours and the hot isostatic pressing is carried out at a diffusion bonding temperature $T_D$ in the range from 1150° to 1200° C.

4. A method as claimed in claim 1, wherein the oxide-dispersion-hardened nickel-based superalloy has the following composition:

Cr = 20.0% by weight
Al = 6.0% by weight
Mo = 2.0% by weight
W = 3.5% by weight
Zr = 0.19% by weight
B = 0.01% by weight
C = 0.05% by weight
$Y_2O_3$ = 1.1% by weight
Ni = Rest and wherein the heat treatment to remove the consequences of the cold working is carried out at a temperature of 1100° to 1150° C. for 2 hours and the hot isostatic pressing is carried out at a diffusion bonding temperature $T_D$ in the range from 1150° to 1200° C.

5. A method as claimed in claim 1, wherein the oxide-dispersion-hardened nickel-based superalloy has the following composition:

Cr = 17.0% by weight
Al = 6.0% by weight
Mo = 2.0% by weight
W = 3.5% by weight
Ta = 2.0% by weight
Zr = 0.15% by weight
B = 0.01% by weight
C = 0.05% by weight
$Y_2O_3$ = 1.1% by weight
Ni = Rest and wherein the heat treatment to remove the consequences of the cold working is carried out at a temperature of 1100° to 1150° C. for 2 hours and the hot isostatic pressing is carried out at a diffusion bonding temperature $T_D$ in the range from 1150° to 1200° C.

6. A method as claimed in claim 1, wherein the workpiece to be manufactured is thermal machine blading which exceeds the cross-sectional dimensions of a conventionally manufacturable semi-finished product, and wherein two workpiece parts, mutually complementary in the transverse direction with respect to the longitudinal axis of the blade, are initially machined out of the prismatic semi-finished product in such a way that the bonding zone comes to be located at the position of the maximum profile thickness of the airfoil and its plane comes to be located in the direction of the maximum bending forces to be expected in operation.

7. A method according to claim 6, wherein the workpiece to be manufactured is blading provided with two longitudinally directed cooling ducts and wherein the two workpiece parts from which the blading is bonded together are machined out of the semi-finished product in such a way that the bonding zone comes to be located in the center of the longitudinally extending partition of the blading.

8. A method as claimed in claim 5, wherein the workpiece to be manufactured is blading provided with a longitudinally directed cooling duct, and wherein the two workpiece parts from which the blading is bonded together are machined out of the semi-finished product in such a way that the bonding zones are located in a plane and come to be located at the positions of the hollow profile of the airfoil where the mechanical loads to be expected in operation are a minimum.

* * * * *